March 6, 1928.  E. L. SCHUMACHER  1,661,271
OPHTHALMIC MOUNTING
Filed Jan. 22, 1926  2 Sheets-Sheet 1
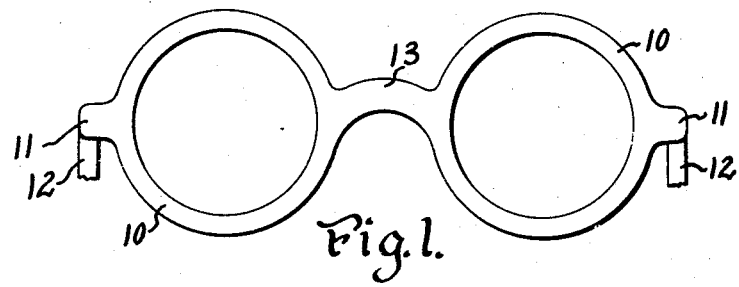
Fig. 1.
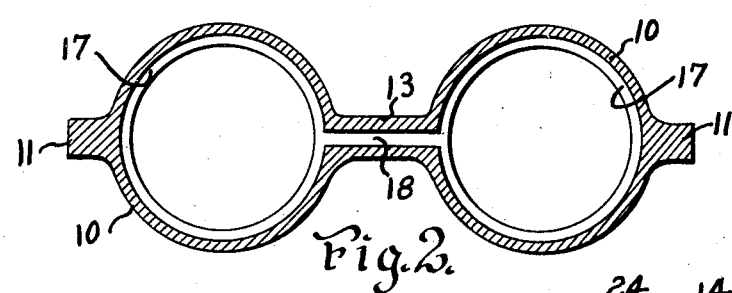
Fig. 2.
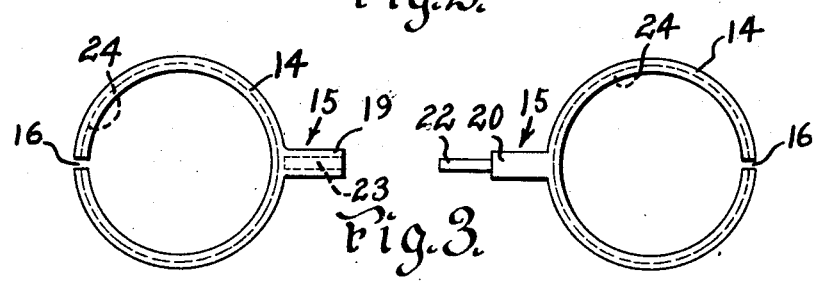
Fig. 3.
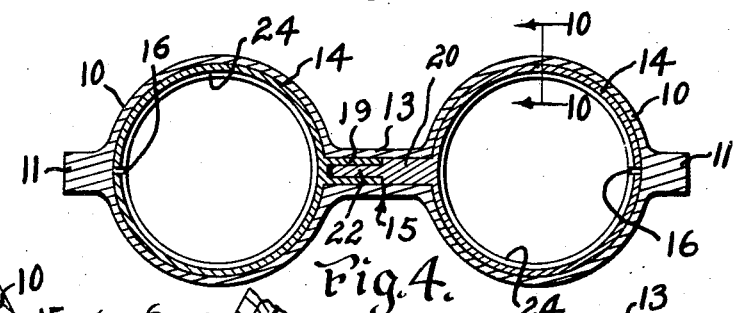
Fig. 4.
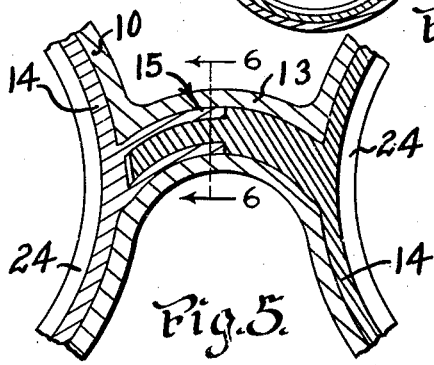
Fig. 5.
Fig. 6.
Inventor
Elmer L. Schumacher.
By Harry H. Styll.
Attorney

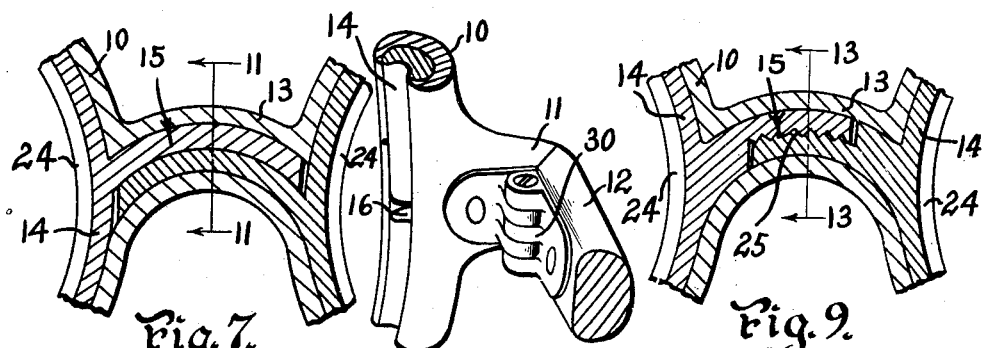

Patented Mar. 6, 1928.

1,661,271

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed January 22, 1926. Serial No. 83,001.

This invention relates to ophthalmic mountings and has particular reference to an improved construction of composition nonmetallic mountings reinforced by metallic reinforcings, and an improved process for manufacture of same.

The principal object of the invention is the provision of improved means for reinforcing the bridge and rims of such a mounting and of improved methods of inserting and securing the reinforcing means.

Another object of the invention is the provision of improved means for interlocking the reinforcing means.

Another object of the invention is to provide improved means for attaching the temples to the ends of the rims of the mounting.

Another object of the invention is the provision of an endpiece construction and temple attachment for such a mounting.

Another object of the invention is to provide improved means whereby the bridge of the mounting may be made to retain its adjusted positions when fitted to the wearer.

A further object of the invention is to provide simple, efficient and economical means for the manufacture of a mounting of this character.

Other objects and advantages of the improved construction will be readily apparent by reference to the following specification taken in connection with the accompanying drawings, and it will be understood that I may make any modification in the specific details of construction shown and described within the scope of the appended claims without departing from or exceeding the spirit of the invention. The preferred forms of the invention only having been shown and described by way of illustration.

Referring to the drawings:

Figure 1 is a front elevation or outside view of a finished ophthalmic mounting embodying the invention.

Figure 2 is a longitudinal sectional view of an ophthalmic mounting showing a step in the process of manufacture.

Figure 3 shows the metal reinforcing members used in the invention.

Figure 4 is a longitudinal sectional view showing how the reinforcing members are assembled and fitted in the composition frames.

Figure 5 is an enlarged longitudinal cross section of the bridge showing the bridge and reinforcing members bent to shape.

Figure 6 is a cross section on line 6—6 of Figure 5.

Figure 7 is a view similar to Figure 5 showing a modification of the reinforcing parts.

Figure 8 is a fragmentary enlarged view of the temple connection to the lens rims.

Figure 9 is a view similar to Figure 5 showing another modification of the reinforcing members.

Figure 10 is a cross section on line 10—10 of Figure 4.

Figure 11 is a cross section on the line 11—11 of Figure 7.

Figure 12 is a fragmentary view partly in section showing the connection of the endpieces to the lens rims of the mounting shown in Figure 17.

Figure 13 is a cross section on line 13—13 of Figure 9.

Figure 14 is a view similar to Figure 5 showing another modification of the reinforcing members.

Figure 15 is a cross section on line 15—15 of Figure 14.

Figure 16 is a fragmentary view partly in section showing the connection of the ends of the reinforcing rims to the endpiece of the mounting shown in Figure 1.

Figure 17 is a front view of a mounting having the reinforcing bridge and rims of the invention and metallic endpieces.

Figure 18 is a fragmentary view partly in section showing the connection of the ends of the reinforcing rims in a modified form.

Figure 19 is a fragmentary view partly in section showing a split endpiece construction and temple connection for the same.

In the drawings, I have shown what is ordinarily termed an all celluloid or composition ophthalmic frame comprising a pair of composition lens rims 10 having the endpieces 11 for the temples 12. The rims 10 being connected by an integral bridge member 13. Ordinarily a mounting of this kind has been made entirely of composition material, either without any metal entering into it, or else with metal only at the endpieces or joints to aid in uniting the parts and connect a temple thereto. This is the appearance also presented by the present mounting. The difference however, will be understood by reference to Figure 4, from which it will be seen that contained within each of the rims 10, is a metallic frame 14 and passing centrally through the bridge 13 is a metallic bridge 15 making a complete metallic frame contained within the non-metallic frame. This metallic frame terminates as at 16 to form a split metal rim or frame 14.

In the formation of the mounting the rim portions 10 are constructed with the interior grooves as at 17 for the metal lens rims 14 while the bridge is in unbent form. The bridge is drilled or the like to form the recess 18, as shown in Figure 2 the size of the recess being just sufficient to receive the metallic bridge portions 15. The bridge consists of a tubular lug member 19 mounted on the periphery of one of the metallic lens rims 10 and a second lug member 20 provided with the stud or rod portion 22 adapted to fit in the recess 23 of the tubular lug member 19. This second lug member 20 being mounted on the periphery of the other metallic lens rim 14. It will be readily seen that when the bend is made to form the bridge 13 that the metallic bridge member 15 will be securely united and there will be no chance for the parts to slide out of engagement.

In assembling this particular construction one of the lug portions carried by the rim 14 is slid from one side into the recess 18 and the metallic lens rim 14 is positioned in the groove 17 of the composition frame 10. The second lug portion carried by the second rim member 14 is slid into the recess 18 from the opposite side, the stud 22 entering the recess 18 thus uniting the metallic rim members 14 and positioning the second rim member 14 within the frame portion 10.

These metallic rim portions 14 are left split with a space between the ends as at 16 to enable the composition frames to be expanded so that the lenses may be inserted in the lens grooves 24 formed in the metallic rim portions 14.

When the bridge 13 with the inserted metallic bridge 15 is bent to shape as shown in Figure 5 it is apparent that the bending of the portions 19 and 20 and the stud 22 will lock the stud in the recess 18 so that the two metallic rims 14 cannot come apart.

The advantage of making the metallic rims 14 in two parts is that they may be inserted in the composition frame, one part from each side, and locked in place by the bending of the bridge to shape. Hitherto it has been impossible to insert a complete metallic frame within a composition frame without splitting the composition frame. This invention therefor provides a simple, efficient and economical method of placing a metallic frame within a composition one without marring the composition frame, also it provides easy access in preparing the composition frame for the metallic one in that the recess 18 in the bridge may be bored if desired from each side, meeting in the center.

Instead of making the metallic bridge 15 of a stud and recess member as shown in Figure 3, the parts of the bridge may be overlapped as in Figure 7, or half lapped as in Figure 9 with the serrations 25. Serrations may be used on the outside also as shown in Figure 14.

Instead of leaving a space between the ends as at 16 Figures 3 and 4 the ends may be bent as at 26 Figures 16 and 18 and secured in a recess 27 of the endpiece 11. For additional security the two ends may be fastened together by a screw 28 or other fastening means as shown in Figure 18.

Also metallic endpiece members 29 may be used instead of the composition endpieces 11. The metallic endpieces 29 being soldered or otherwise secured to the ends of the metallic rims 14 as shown in Figures 12 and 17.

Where a composition endpiece 11 is used the temple 12 may be attached by the ordinary temple hinge 30 as shown in Figure 8, or the composition endpiece may be split at 31 Figure 19 and the temple 12 attached to one of the endpiece sections by the hinge 30 and the two sections of the split endpiece secured together by a screw 32 engaging a metallic bushing 33 in one of the sections. In this construction the lens may be inserted in the rims by loosening the screw 32 without disturbing the temple connection.

From the foregoing description of the manufacture of parts and the arrangement of same, it will be seen that simple, inexpensive and efficient means have been provided to carry out the objects of the invention and to provide a frame of composition reinforced with a complete frame of metal without marring or separating the composition frame.

Having described the invention I claim:

1. In a device of the character described, a composition frame having grooved rims and a bridge with a recess therein extending from groove to groove of the rims and a metallic frame having two separated rims seated in the grooved rims of the composition frame, each metallic rim having a projection extending into the recess of the bridge of the composition frame into engagement with each other.

2. In a device of the character described a frame having grooved rims and a bridge with a longitudinal recess therein extending from groove to groove of the rims and a pair of rims seated in the grooves of the first frame, each of the second rims having a projection extending into the recess in the bridge of the first frame and interengaging the other projection and with the walls of the recess and a bend in the bridge and the projections therein which locks the projections in the bridge in interengaging relation with each other and with the walls of the recess and holds the second rims in the first.

3. In a device of the character described, a frame having a tubular bridge and grooved rims the tube of the bridge extending from rim to rim, a second frame having rims seated in the grooves of the first frame and projections extending into the bridge tube and engaging the walls thereof, one of said projections being recessed and the other fitting into the said recess and a bend in the tubular bridge and projections which locks the parts together in interfitting relationship with each other and with the walls of the tubular bridge.

4. In a device of the character described, in combination with a frame having a tubular bridge and grooved rims, the tube extending from rim to rim a two part frame having rims seated in the grooves of the first frame and having interengaging projections extending into the tubular bridge in interlocking engagement with the walls of the tubular bridge and with each other.

5. In a device of the character described, a frame having grooved rims and a hollow tubular bridge the tube of the bridge extending from rim to rim, a second frame having rims seated in the grooves of the first frame, and overlapping projections extending into bore of the tube and interlocked with each other and with the walls of the tubular bridge.

6. In a device of the character described, a frame having grooved rims and a bridge connecting the rims, having a channel connecting the grooves of the rims, second rims in the grooves of the first rim having overlapping projections extending into the bore of the tubular bridge, said projections having means for interlocking with the walls of the channel in the bridge.

7. In a device of the character described a frame having grooved rims, a tubular bridge connecting them, the tube extending from rim to rim, a second frame having rims seated in the grooves of the first frame and overlapping projections extending into the bore of the tubular bridge and serrated means on the projections for locking the overlapping projections in the bore of the tubular bridge.

8. In a device of the character described, a frame having grooved rims and a tubular bridge connecting them, a second frame having rims seated in the grooves of the first frame and projections extending into the bore of the tubular bridge and serrations on the projections for retaining the projections in the bore of the tubular bridge.

9. The process of making a combination ophthalmic mounting comprising grooving the rims of a frame, piercing a channel through the bridge longitudinally connecting the grooves, making two rims with interengaging projections, entering the projections in the channel of the bridge into interengagment with each other, seating the rims in the grooves, and bending the bridge and interengaged projections to lock the projections in the bridge with each other.

10. The process of making a combination ophthalmic mounting comprising grooving the rims of a frame, piercing a longitudinal channel through the bridge from groove to groove, making a frame member with a rim and a recessed projection, making another frame member with a rim and a tongue projection, entering the recessed projection into the channel and seating the rim in a groove of the first frame, entering the tongue projection and into the channel and into the recess in the recess projection and seating the rim in the other groove of the first frame, and bending the bridge and projections to lock the projections in the bridge.

11. The process of making a combination ophthalmic mounting comprising grooving the rims of a frame, piercing a longitudinal channel in the bridge from groove to groove, making a frame member with a projection, making another frame member with a projection, entering the projections in the channel of the bridge, seating the frame members in the grooves in the first frame, interengaging the projections one with the other, and bending the bridge and entered projections to lock the projection in the bridge.

12. In a device of the character described, in combination with a frame having grooved rims and a tubular bridge connecting them, a rim member with a projection, a second rim member with a projection and interengaging members on the projections, said rims with projections being adapted to be seated in the grooves and said projections being adapted to fit in and be secured in the tubular bridge by the interengaging means.

ELMER L. SCHUMACHER.